(12) United States Patent
Ophey

(10) Patent No.: US 6,407,973 B1
(45) Date of Patent: Jun. 18, 2002

(54) DEVICE FOR SCANNING AN OPTICAL RECORD CARRIER HAVING AT LEAST TWO INFORMATION LAYERS

(75) Inventor: Willem G. Ophey, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/397,740

(22) Filed: Sep. 16, 1999

(30) Foreign Application Priority Data

Sep. 21, 1998 (EP) .............................................. 98203150

(51) Int. Cl.[7] ................................................. G11B 7/00
(52) U.S. Cl. .............................. 369/112.07; 369/112.01; 369/112.15
(58) Field of Search ........................... 369/103, 109.01, 369/109.02, 112.03, 112.04, 112.07, 112.01, 112.12, 112.15

(56) References Cited

U.S. PATENT DOCUMENTS

| 4,665,310 A | | 5/1987 | Heemskerk ................. 250/201 |
| 4,829,506 A | | 5/1989 | Bressers et al. ............ 369/112 |
| 4,908,506 A | | 3/1990 | Coops et al. ............. 250/201.5 |
| 4,924,079 A | | 5/1990 | Opheij et al. ............ 250/201.5 |
| 5,652,744 A | * | 7/1997 | Freeman et al. ............ 369/103 |

* cited by examiner

*Primary Examiner*—Nabil Hindi
(74) *Attorney, Agent, or Firm*—Michael E. Belk

(57) ABSTRACT

In a device for scanning an optical record carrier having two or more information layers, in which a diffraction element with two gratings is used in combination with a composite detection system for generating a focus error signal, a focus offset due to radiation coming from another information layer is prevented during scanning an information layer by providing the diffraction element with a special transition area in which, in principle, equal parts of the first and the second grating are present.

9 Claims, 7 Drawing Sheets

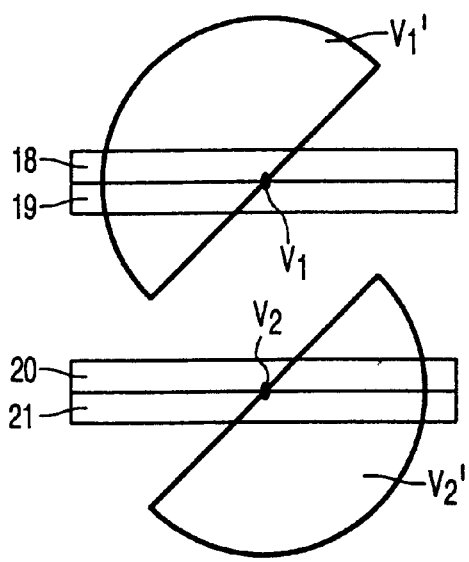
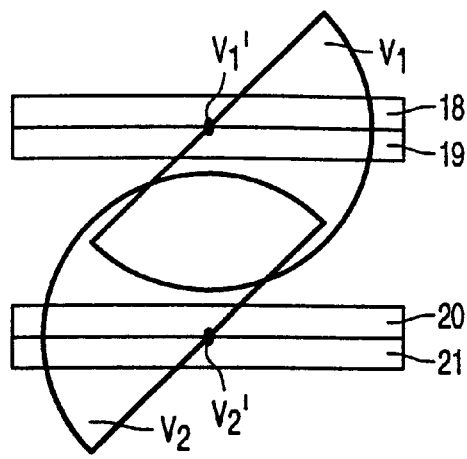
FIG. 7a    FIG. 7b
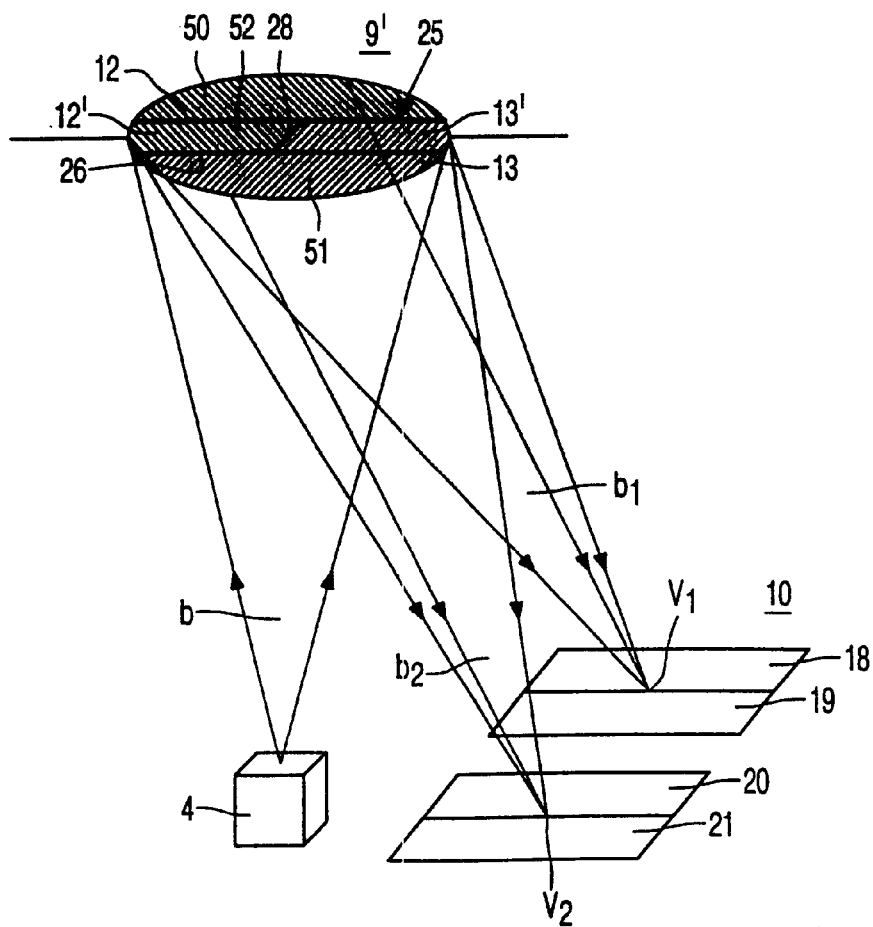
FIG. 8

DEVICE FOR SCANNING AN OPTICAL RECORD CARRIER HAVING AT LEAST TWO INFORMATION LAYERS

Device for scanning an optical record carrier having at least two information layers.

FIELD OF THE INVENTION

The invention relates to the field of optical data storage and retrieval and more particularly to scanning optical system used for such storage and retrieval.

BACKGROUND OF THE INVENTION

The invention relates to an optical device for scanning an information layer in an optical record carrier having at least two information layers, said device comprising a radiation source for supplying a scanning beam, an objective system for focusing the scanning beam to a scanning spot on the desired information layer, a composite diffraction element arranged between the radiation source and the objective system and comprising two contiguous gratings for diffracting a radiation beam coming from the desired information layer to a composite radiation-sensitive detection system and for splitting said beam into a first and a second sub-beam constituting a first and a second detection spot in the plane of the detection system, the detection system comprising separate detection elements for the detection spots, with two detection elements for at least one of the detection spots.

A device of this type is known from, for example, U.S. Pat. No. 4,665,310 for reading an optical record carrier having a single information layer. In this device, the diffraction element fulfils two functions for which otherwise two separate elements would be required. First, this element ensures that the radiation beam which is reflected and modulated by the information layer and passes through the objective system follows a different optical path than the beam emitted by the radiation source, so that a radiation-sensitive detection system can be placed in the path of the modulated radiation beam. Furthermore, the composite diffraction element splits the reflected beam into two sub-beams by means of which a focus error signal is obtained, i.e. a signal comprising information about the magnitude and the direction of a deviation between the focal plane of the objective system and the information layer. To this end, the detection system of the known device comprises four detection elements which constitute two pairs. Each of the two sub-beams is applied to a separate pair of detection elements. A sub-beam is converged to a radiation spot, hereinafter referred to as detection spot, on the associated pair of detection elements. When the scanning beam is focused on the information layer, the detection spot is minimal and the center of this spot is situated symmetrically with respect to the separating strip in the relevant pair of detection elements. The elements of the relevant pair then receive an equal amount of radiation from the relevant sub-beam. If a deviation occurs between the focus of the scanning beam and the information plane, the detection spot becomes asymmetrically larger and the detection elements of the relevant pair receive different amounts of radiation from the relevant sub-beam. The difference between the output signals of the elements of the same pair is thus indicative of the extent to which the scanning beam is focused on the information plane. In the known device, the boundary line between the two gratings is a single straight line which is perpendicular to the optical axis of the objective system and, for example, perpendicular to the line of connection between the centers of the two pairs of detection elements.

To increase the storage capacity of an optical record carrier, it has already been proposed to incorporate two or more information layers instead of one in this record carrier. To be able to read all information layers, all of these layers, with the exception of the last of the stack, should be partially transparent. When a given information layer is being read, the scanning beam must be focused sharply, and remain focused sharply, on this layer. When another layer is being read, the focus of the scanning beam must be readjusted, for example, by moving the objective system in an axial direction. To maintain the focus on a selected information layer, the focus error detection system with the composite diffraction element and the two pairs of detection elements as described in U.S. Pat. No. 4,665,310 can be used.

When, in a record carrier with two information layers, the information layer located furthest remote from the objective system is being read, radiation is not only reflected by this layer but also by the information layer located closest to the objective system. In contrast, when the information layer located closest to the objective system is being read, radiation will not only be reflected by this layer but also by the layer located furthest remote from the objective system because the first-mentioned layer passes radiation to the last-mentioned layer which reflects the radiation. As a result, not only a said detection spot is formed on each detector pair, but also an additional, or extra, spot. Such an additional spot has an asymmetrical radiation distribution with respect to the separating strip of the relevant pair of detection elements, because the radiation originates from an information layer which is situated out of focus, so that the output signals from the detection elements of this pair are not equal, even if the scanning beam is focused on the selected information layer. Thus, an offset is produced in the focus error signal. Since the focus servo will correct in such a way that the focus error becomes zero, the scanning beam is then no longer satisfactorily focused on the selected layer.

Those skilled in the art are further directed to review U.S. Pat. Nos. 4,924,079, 4,908,506 and 4,829,506. The above citations are hereby incorporated in whole by reference.

SUMMARY OF THE INVENTION

It is an object of the present invention to provide a device of the type described in the opening paragraph in which this problem is prevented. To this end, the device according to the invention is characterized in that the surface of the composite diffraction element consists of a first area in which a main part of the first grating is located, a second area in which a main part of the second grating is located, and a third, elongated transition, area in which further parts of the first and the second grating are located, the surface occupied by the first grating in the transition area being, in principle, equal to the surface occupied by the second grating.

The invention is based on the recognition that by choosing, instead of a straight boundary line between the two gratings, a transition area in which equal parts of both gratings are located, an additional radiation spot can be given such a shape that the detection elements of a pair associated with that spot receive the same amount of radiation from the additional radiation spot so that this spot cannot cause any difference between the output signals of the elements of this pair. Thus, the cause of a focus offset is eliminated in a simple manner. In this context, "in principle, equal" is understood to mean that the surfaces of the first and the second grating within the transition area are equal if the scanning beam has a uniform intensity, whereas these surfaces may slightly differ, dependent on the intensity distribution, if the scanning beam does not have a uniform intensity, for example, a Gaussian intensity distribution.

A preferred embodiment of the device according to the invention is further characterized in that the transition area consists of a first and a second portion in which a part of the first grating and a part of the second grating, respectively, are located.

An alternative embodiment of the device is further characterized in that the transition area has a boundary line, on one side of which a part of the first grating is enclosed by two parts of the second grating, and on the other side of which a part of the second grating is enclosed by two parts of the first grating.

Within the transition area, the gratings may be further subdivided so that more than three parts of the first grating and of the second grating are located in this area.

In principle, it is sufficient when the detection system comprises a pair of detection elements which co-operates with one of the detection spots, and a third detection element which co-operates with the other detection spot. The difference between the output signals of the detection elements of the pair then comprises information about a possible focus error, while the output signal of the third detection element, in combination with the output signals of the pair of detection elements, represents the signal which has been read and/or comprises information about a possible tracking error.

A preferred embodiment of the device is, however, characterized in that the detection system comprises a first and a second pair of detection elements for the first and the second detection spot.

By suitable combination of the output signals of the four detection elements, a focus error signal can be obtained which has a better signal-to-noise ratio and, moreover, is insensitive to an alignment error of the boundary line between the gratings with respect to the detection system, respectively.

This embodiment is preferably further characterized in that the separating strip in each pair of detection elements is oriented in such a way that:

the path along which the center of the intensity distribution of the associated detection spot is displaced at a change of the wavelength of the scanning beam coincides with said separating strip, and said separating strip is, in principle, parallel to a line connecting the center of the emissive surface of the radiation source to the center of the radiation-sensitive detection system.

In this embodiment, a wavelength change, which may occur when using a diode laser as a radiation source, has no influence on the focus error signal, while the device can still be assembled easily.

As regards the structures of the two gratings and the associated arrangement of the pairs of detection elements, the device according to the invention may be implemented in various ways. These possibilities are defined in claims 7–9.

These and other aspects of the invention will be apparent from and elucidated with reference to the embodiments described hereinafter.

BRIEF DESCRIPTION OF THE DRAWINGS

In the drawings:

FIGS. 7a and 7b show the additional radiation spots which are formed on the detection system when rotating the boundary line in the diffraction element;

FIG. 8 shows an embodiment of the device according to the invention;

DETAILED DESCRIPTION OF THE PREFERRED EMBODIMENTS

Figure 1:
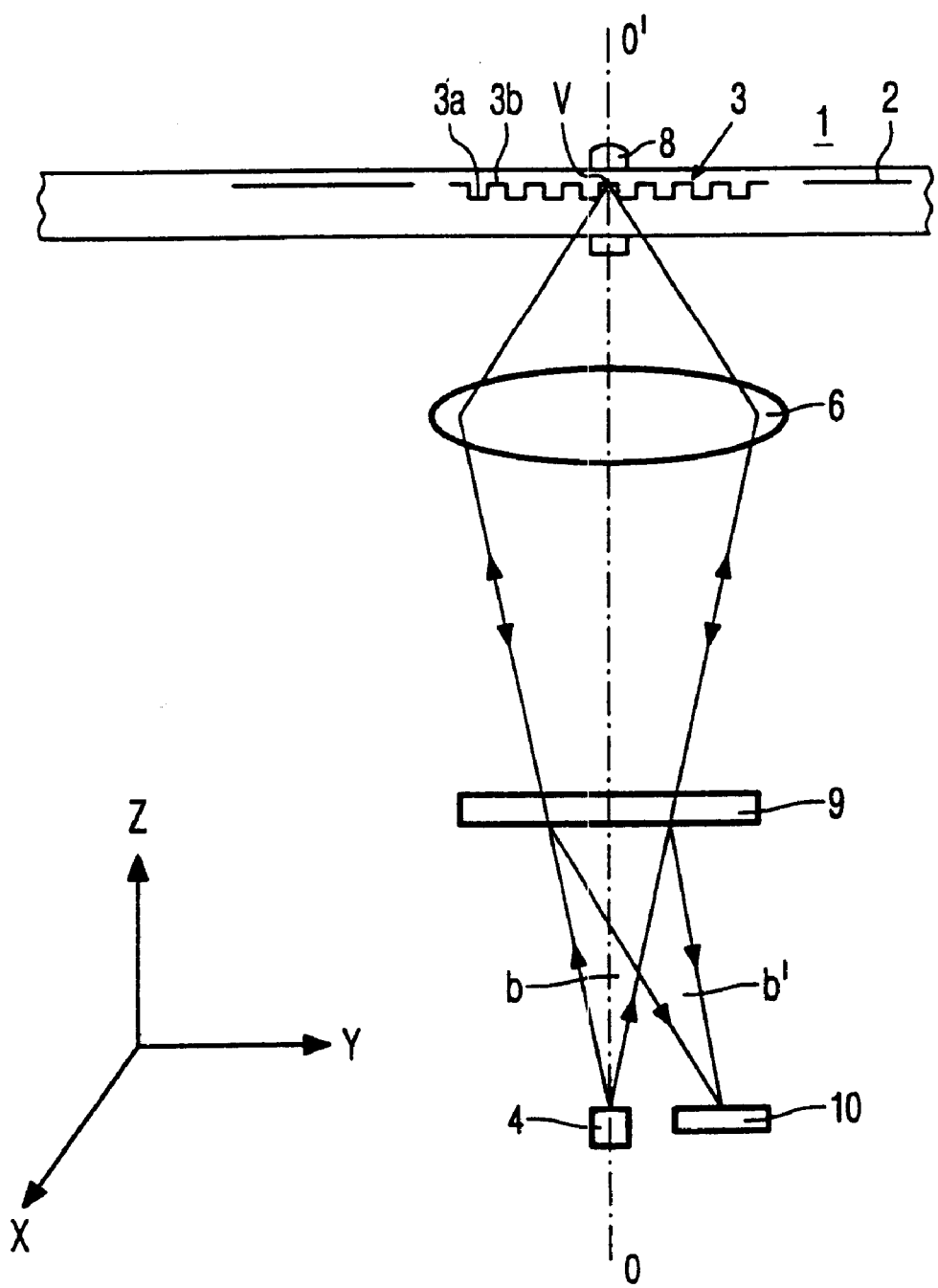
FIG. 1 is a diagrammatic cross-section of an embodiment of a known scanning device with a diffraction element.

FIG. 1 shows a small part of an optical, disc-shaped record carrier 1 with a radiation-reflecting information layer 2 in a tangential cross-section. This Figure shows a small part of one of the large number of information tracks 3 which are juxtaposed in the information plane 2 in the radial direction, perpendicular to the plane of the drawing. Such a track comprises information areas 3a which alternate with intermediate areas 3b. The information areas are distinguished from the intermediate areas, for example, because they are located at a different height or have a different reflection coefficient or direction of magnetization than their surroundings. The information layer may be scanned with a scanning beam b emitted by a radiation source 4, for example, a diode laser. This beam is focused by an objective system 6, diagrammatically shown by way of a single lens element, to a scanning spot V in the information layer. A collimator lens, as assumed in FIG. 1, may be integrated in the objective system. It is a customary alternative to arrange a separate collimator lens in the radiation path between the radiation source and the objective system.

By rotating the record carrier about an axis 8, which is parallel to the optical axis OO' of the device, an information track is scanned and the scanning beam is modulated with the information stored in the track. By moving the record carrier and the scanning device with respect to each other in the radial direction, all information tracks can be scanned.

The beam reflected and modulated by the information layer must be diffracted from the path of the on-going scanning beam and directed towards the radiation-sensitive detection system 10 so that this system can convert the modulated beam $b^1$ into an electric signal representing the information which has been read. To this end, the device comprises a beam-separating element 9.

To be able to read an information structure with small information details, for example, of the order of 1 μm or less, the objective system must have a large numerical aperture. However, such an objective system has a small depth of focus. Since variations of the distance between the objective system and the information layer may occur which are larger than this depth of focus, facilities must be provided to be able to detect these variations and to correct the focus with reference to a detected deviation. To detect a focus error signal, the beam-separating element 9 is implemented in such a way that it also splits the reflected beam into two sub-beams, and the detection system consists of, for example, two pairs of detection elements, one pair of which co-operates with the first sub-beam and the other pair co-operates with the second sub-beam.

As described in U.S. Pat. No. 4,665,310, the beam separation and beam splitting may be realized with a single element, namely a transparent grating. This grating splits the beam reflected by the information layer 2 and passing through the objective system into a non-diffracted, zero-order sub-beam and a plurality of first and higher-order sub-beams. One of these sub-beams, preferably a first-order sub-beam, reaches the detection system 10 and is used, inter alia, for generating the focus error signal. The grating parameters, notably the quotient of the width of the grating strips and the width of the intermediate strips and the depth and shape of the grating grooves may be chosen to be such that a maximum quantity of radiation is incident on the detection system.

Figure 2:
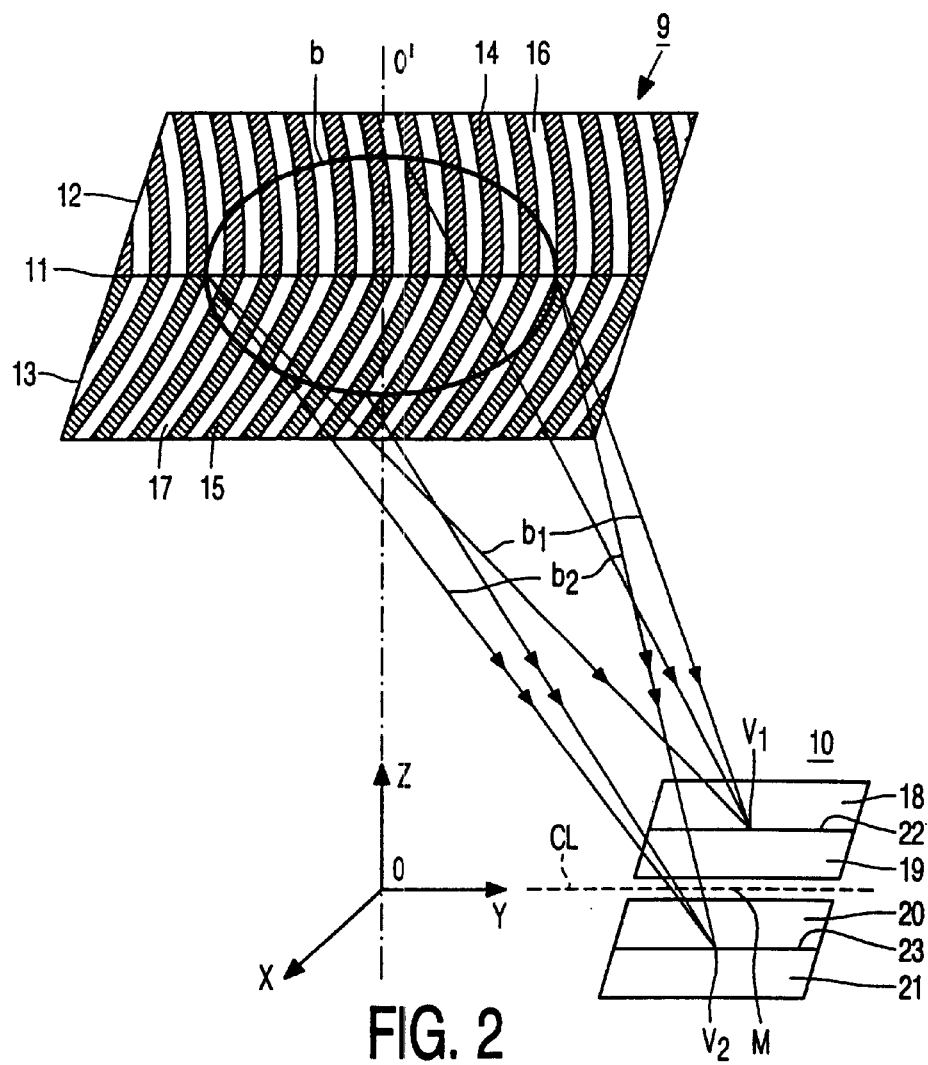
FIG. 2 is a diagrammatic perspective view of a first embodiment of a known detection system and the associated diffraction element for this device.

FIG. 2 shows a first embodiment of the radiation-sensitive detection system 10 and the associated diffraction element 9. This element comprises two gratings 12 and 13 which are separated from each other by a boundary line 11. The grating strips of the gratings are denoted by the reference numerals 14 and 15, respectively. Intermediate strips 16 and 17 are situated between the grating strips. In this embodiment, the gratings have the same grating periods, but the main, or average, direction of the preferably curved grating strips 14 of the grating 12 extends at a first angle to the boundary line, whereas the main direction of the curved grating strips 15 of the grating 13 extends at a second, preferably equally large but opposite angle to the boundary line. The sub-beams are diffracted by the gratings in a direction which is perpendicular to the main direction of the grating strips. Since the main directions for the two gratings are different, the sub-beams $b_1$ and $b_2$ coming from these gratings are diffracted at different angles in the XZ plane. This means that the detection spots $V_1$ and $V_2$ formed by the sub-beams are moved with respect to each other in the X direction in the plane of the detection system, the XY plane. In this Figure and the following Figures, the references X, Y and Z are the axes of a rectangular system of coordinates whose origin O coincides with the center of the radiation-emissive surface of the diode laser 4.

Figure 3A:
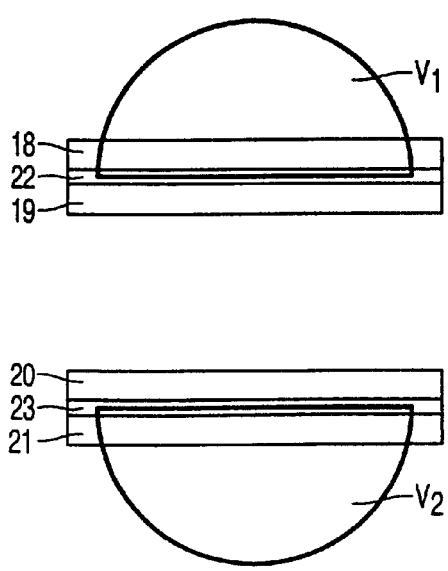
FIGS. 3a and 3b show the radiation spots formed on this detection system upon defocusing.
Figure 3B:
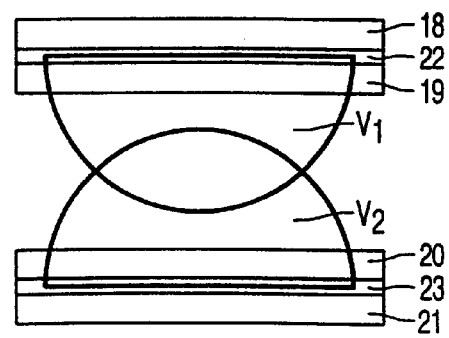

The detection system comprises a first pair of detection elements 18 and 19, which co-operates with the sub-beam $b_1$, and a second pair of detection elements 20 and 21, which co-operates with the sub-beam $b_2$. The elements of the first pair are separated from each other by means of a narrow separating strip 22 and those of the second pair are separated by means of a narrow separating strip 23. The detection elements are positioned in such a way that, in the case of a correct focusing of the scanning beam b on the information plane, the distribution of radiation of the detection spots $V_1$ and $V_2$ formed by the sub-beams is symmetrical with respect to the detection elements 18, 19 and 20, 21. When a focus error occurs, the detection spots $V_1$ and $V_2$ become asymmetrically larger, as is shown in FIGS. 3a and 3b. FIG. 3a shows the situation where the focus of the scanning beam is situated behind the information plane 2 and FIG. 3b shows the situation where the focus of the scanning beam is situated in front of the information plane.

If the output signals of the detection elements 18, 19, 20 and 21 are represented by $S_{18}$, $S_{19}$, $S_{20}$ and $S_{21}$, respectively, the focus error signal $S_f$ is defined by:

$$S_f = (S_{18} + S_{21}) - (S_{19} + S_{20}).$$

A signal which is proportional to the information which has been read, i.e. the information signal $S_i$, is defined by:

$$S_i = S_{18} + S_{19} + S_{20} + S_{21}.$$

If the boundary line between the two gratings is parallel to the direction of the track portion which is read instantaneously, a tracking error signal $S_r$ may also be generated by means of the signals from the detection elements 18, 19, 20 and 21. This signal is defined by:

$$S_r = (S_{18} + S_{19}) - (S_{20} + S_{21}).$$

The focus detection principle described may also be used for reading a record carrier comprising a plurality of information layers, for example, two information layers. Such a record carrier is shown diagrammatically in FIG. 4. The second information layer is denoted by 2'. In order that also the second information layer can be read with the scanning beam, the first information layer 2 must be partially transparent, preferably semitransparent. This means that, when reading the first information layer, a portion of the radiation of the scanning beam focused on the first information layer 2 passes through this information layer, reaches the second information layer 2' and is reflected by this layer. The radiation path of this radiation is denoted by means of the broken lines. This radiation also passes through the objective system and is diffracted by the diffraction element 9 to the detection system 10 and focused by the objective system. However, the focus of this radiation, denoted by V", is located in a plane in front of the plane of the detection system because the focus of the scanning beam is located in front of the information plane 2'. This means that two additional, large and asymmetrical, spots V'$_1$ and V'$_2$ are formed in the plane of the detection system, as is shown in FIG. 5a.

Figure 4:
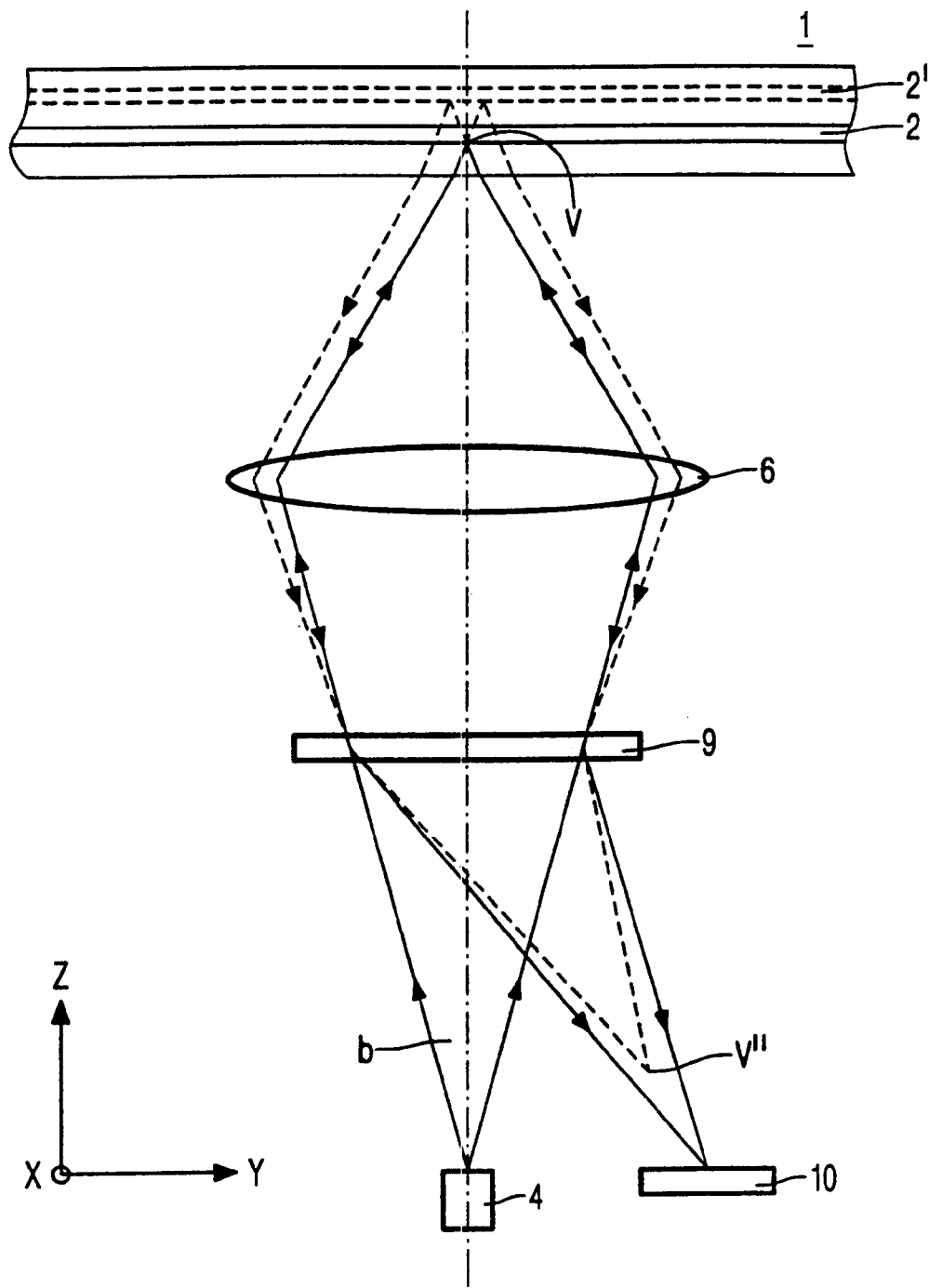
FIG. 4 shows the extra reflected beam which is produced when a record carrier with two information layers is being read.
Figure 5A:
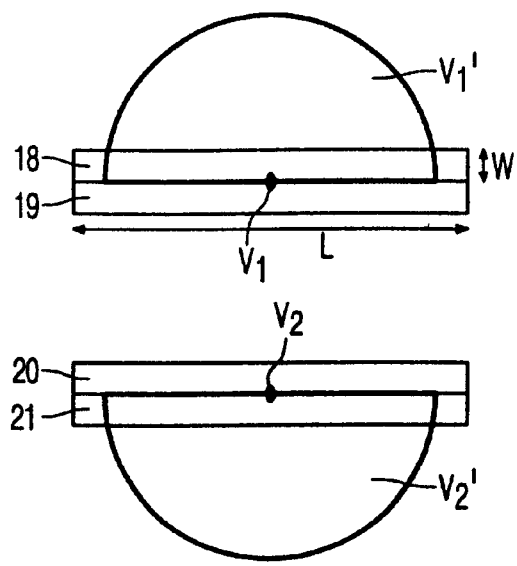
FIGS. 5a and 5b show the additional radiation spots formed by this extra beam on the detection system.
Figure 5B:
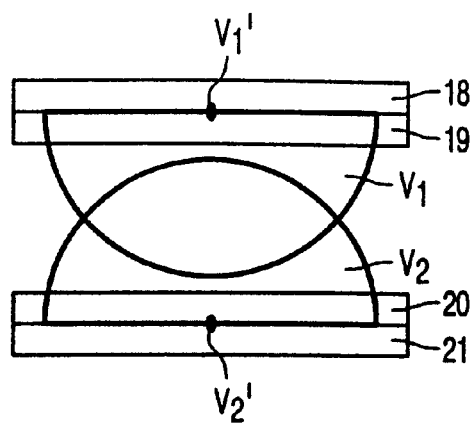

In FIGS. 5a and 5b and in the following Figures, it has been assumed that the information plane 2 is located above the information plane 2', hence opposite to the situation shown in FIG. 4. FIG. 5a shows the situation where the scanning beam is focused on the information layer 2. The detection spots $V_1$ and $V_2$ coming from this layer are then minimal and are each located symmetrically with respect to the associated detection elements 18, 19 and 20, 21. The additional spots V'$_1$ and V'$_2$ coming from the information layer 2' are, however, asymmetrical with respect to the detection elements 18, 19 and 20, 21, respectively. In spite of the fact that the scanning beam is focused on the desired information layer, the focus error signal is thus unequal to zero. Consequently, a focus servosystem of the device will start correcting in such a way that the focus error signal becomes zero so that the scanning beam is no longer focused on the information layer 2, in other words, a focus offset is produced. FIG. 5b shows the situation where the scanning beam is focused on the second information layer 2'. The radiation spots V'$_1$ and V'$_2$ are then the detection spots and the radiation spots $V_1$ and $V_2$ are the additional spots. The radiation of these spots now ensures that the focus error signal is unequal to zero, despite the fact that the scanning beam is focused on the desired information layer 2'. Analogously as described for the information layer 2, a focus offset is now produced with respect to the information layer 2'.

There are various ways of reducing the focus offset or its effect, but each of these ways has one or more drawbacks.

For example, the width w of the detection elements could be reduced. However, then the capturing range, i.e. the largest focus error which can still be detected, as well as the control range of the focus servosystem are reduced.

Alternatively, the length l of the detection elements could be reduced. However, the control range, i.e. the initial positioning of the detection spots with respect to the associated detection elements during assembly of the device would become insufficient. Moreover, the detection spots would rapidly get beyond the associated pairs of detection elements in the case of wavelength variations of the scanning beam.

Another possibility would be to divide the detection elements into a number of short sub-detection elements and activate them separately in an electronic process. However, this would require extra electronics. Moreover, the offset cannot be reduced completely in that case.

Yet another possibility is to compensate the offset electronically by means of a forward-control method in which it is first detected whether there is a deviation, then a control signal having a given polarity and amplitude is given, while subsequently it is detected whether the deviation becomes larger or smaller, and then a control signal of the desired polarity and amplitude is given, and so forth. However, such a method requires extra electronics. Moreover, such a method slows down the servosystem for which a learning time is required.

It is also feasible to cover the part of the diffraction element where the central part of the spot is located, which spot is formed on this element by the scanning beam reflected by the information layer. It is thereby achieved that no radiation of the additional spots $V'_1$ and $V'_2$ is incident on the detection elements 18 and 21 in FIG. 5a. However, when using detection elements 18, 19, 20 and 21 for reading the information, which is the case in practice, the information signal will then become considerably weaker.

Figure 6A:
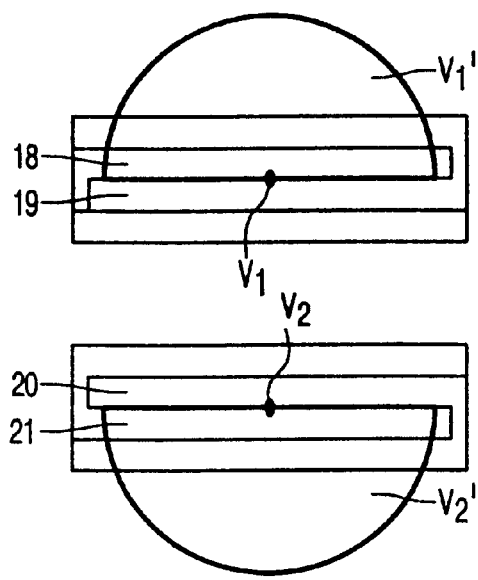
FIGS. 6a and 6b show an alternative embodiment of the detection system.
Figure 6B:
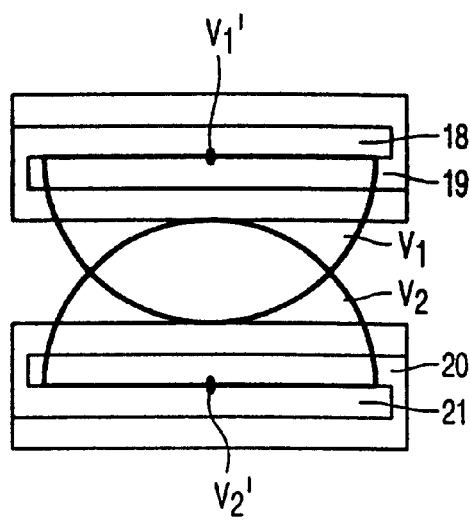
Figure 9A:
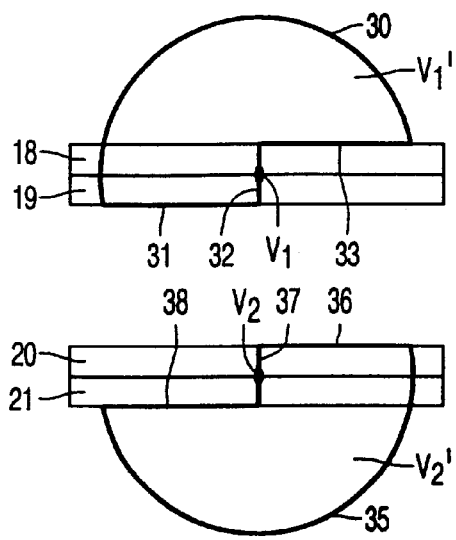
FIGS. 9a and 9b show the additional radiation spots formed in this embodiment on the detection system.
Figure 9B:
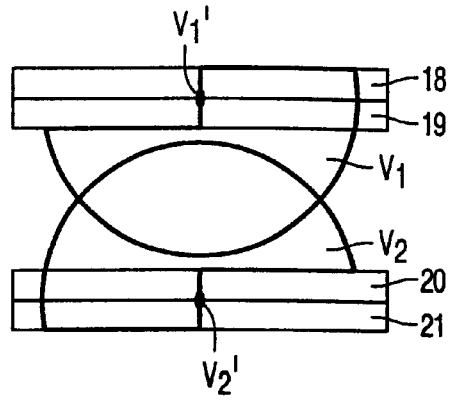

A further possibility is to change the shape of the detection elements, as is shown in FIGS. 6a and 6b. The detection elements are no longer located separately beside each other but are interwoven in such a way that a substantially equal amount of radiation of the additional spots is incident on the detection elements of the associated pairs, so that this radiation hardly influences the detection signal. However, due to this detector geometry, extra noise is produced in the focus error signal. Since the detection elements for the focus error signal are widened, the detection elements (not shown) for generating a tracking error signal must be arranged at a relatively large distance from the center of the detection system. For generating the tracking error signal, a second grating, with which the beam is split into a main beam, the scanning beam, and two side beams, may be arranged in the path of the beam emitted by the source, as has been described in U.S. Pat. No. 4,924,079. Then, not only a scanning spot is formed in the center of the information track to be read but also two tracking spots are formed on the two edges of this track. These tracking spots are imaged by the objective system and the diffraction element 9 as four tracking detection spots in the plane of the detection system. The tracking error signal can be generated by means of these spots and four or two tracking detection elements.

Yet another possibility of reducing said focus offset is to rotate the boundary line in the diffraction element 9 with respect to the longitudinal direction of the detection elements. Consequently, also the additional spots are rotated with respect to these detection elements, as is shown in FIGS. 7a and 7b. The quantities of radiation of the additional spots incident on the associated detection elements will then become more equal to each other. However, full equality cannot be achieved so that the offset cannot be compensated completely. Moreover, it will be difficult to realize the tracking by means of two extra spots beside the scanning spot.

According to the invention, a focus error signal which is, in principle, free from offset may be obtained without one of the above-mentioned drawbacks by creating a transition area in the diffraction element instead of using a straight boundary line, so that the surface of this element consists of three parts. FIG. 8 shows diagrammatically a first embodiment of the device according to the invention. The diffraction element 9' has a first area 50 in which the greater part of the first grating is located, a second area 51 in which the greater part of the second grating is located, and the transition area 52. The edges of the transition area are denoted by 25 and 26. In the embodiment of FIG. 8, the transition area 52 is divided into a first portion 55 in which a further part of the first grating is located, and a second portion 56 in which a further part of the second grating is located.

Due to the change of the transition between the two gratings, shown in FIG. 8, a similar change of the shape of that part of an additional spot, $V'_1$ and $V'_2$, located on the detection elements, 18, 19 or 20, 21, occurs. The outer circumference of the additional spot $V'_1$ in the upper part of FIG. 8a is constituted by a part of a circle 30, a straight line section 31 which coincides with the outer side of the detection element 19, a straight line section 33 which coincides with the outer side of the detection element 18 and a line section 32, transverse to the line sections 31 and 33, in the center of the pair of detection elements. It will be evident that the part of the spot $V'_1$ located on the detection element 18 is substantially as large as the part of the spot located on the detection element 19. The additional spot thus no longer causes any difference between the output signals of the detection elements 18 and 19. The outer circumference of the additional spot $V'_2$ in the lower part of FIG. 8a has similar line sections 35, 36, 37 and 38 located at similar positions with respect to the detection elements 20 and 21. The spot $V'_2$ can thus no longer cause any difference between the output signals of the detection elements 20 and 21. Since the difference signals of the detection elements 18 and 19, on the one hand, and the difference signals of the detection elements 20 and 21, on the other hand, have become independent of the additional spot $V'_1$ and the additional spot $V'_2$, respectively, the offset in the focus error signal upon reading a first information layer due to the presence of a second or further information layer(s) is, in principle, eliminated.

Similarly as in FIGS. 5a, 6a and 7a, FIG. 9a shows the situation where the scanning beam is focused on the information plane 2, while similarly as in FIGS. 5b, 6b and 7b, FIG. 9b shows the situation where the scanning beam is focused on the information plane 2'.

Figure 10A:
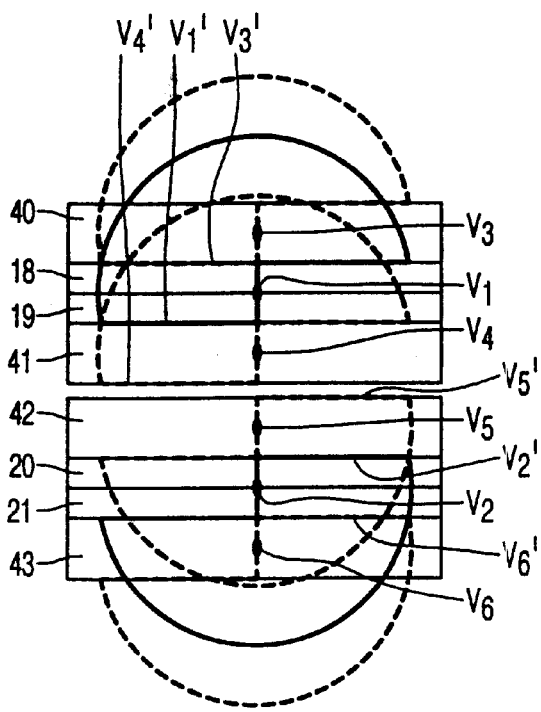
FIGS. 10a and 10b show an embodiment of a detection system for a device in which extra radiation spots are used for the tracking and the radiation spots formed on this system.
Figure 10B:
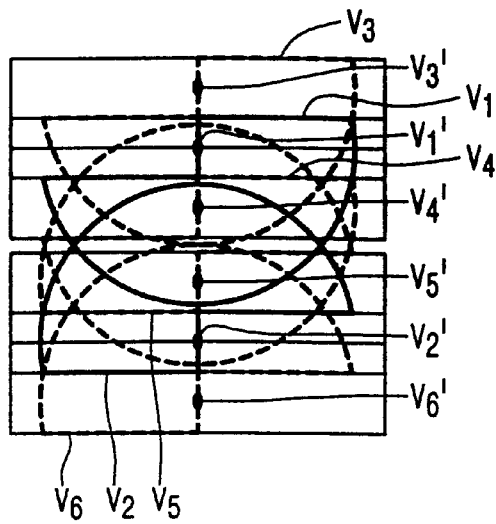

FIGS. 10a and 10b show the detection system and the detection spots formed thereon of a device as described in U.S. Pat. No. 4,829,506 in which the invention has been used. In addition to the detection elements 18, 19, 20 and 21 for generating the focus error signal, this detection system comprises two extra detection elements 40 and 41 which are located on different sides of the pair 18, 19, and two further extra detection elements 42 and 43 which are located on different sides of the pair 20, 21. In this device, a tracking error signal is generated by means of two extra radiation spots on the information layer which, viewed in the radial direction, are located on different sides of the scanning spot and are referred to as tracking spots. If the center of the scanning spot V coincides with the centerline of the information track to be read, the centers of the tracking spots are located on the two edges of this track. The tracking spots are obtained by means of a diffraction grating which is arranged between the radiation source and the diffraction element 9. The tracking spots are imaged by the objective system as tracking detection spots in the plane of the detection system. Since this image is effected via the diffraction element 9, each tracking spot is imaged in two tracking detection spots: one tracking spot in the tracking detection spots $V_3$ and $V_5$ and the other tracking spot in the tracking detection spots $V_4$ and $V_6$. The tracking detection spots $V_3$, $V_4$, $V_5$ and $V_6$ are located on the detection elements 40, 41, 42 and 43, respectively. If the output signals of these elements are represented by $S_{40}$, $S_{41}$, $S_{42}$ and $S_{43}$, the tracking error signal $S_r$ is defined by:

$$S_r = S_{40} - S_{41} + S_{42} - S_{43}.$$

Instead of this tracking error signal, a push-pull, or differential tracking error signal may be generated. A push-pull signal is a signal obtained by subtracting detector signals produced by radiation from the different halves of the pupil of the objective system. The push-pull tracking error signal $S'_r$ of a system in which three radiation spots are formed on the information layer is defined by:

$$S'_r = (S_{18} + S_{19} - S_{20} - S_{21}) - t(S_{40} + S_{41} - S_{42} - S_{43})$$

in which the factor t is a constant which is, inter alia, dependent on the quotient of the intensity of the scanning spot and those of the tracking spots on the information layer.

Also for FIGS. 10a and 10b, the situation in FIG. 10a is the one in which the scanning spot V is focused on the information layer 2, while FIG. 10b shows the situation where the scanning spot is focused on the information layer 2'.

The tracking detection spots could cause some offset in the focus error signal due to overlap. This may be prevented by suitable choice of the distance between the group of spots $V_3$, $V_1$, $V_4$, on the one hand, and the group of spots $V_5$, $V_2$, $V_6$, on the other hand.

Figure 11:
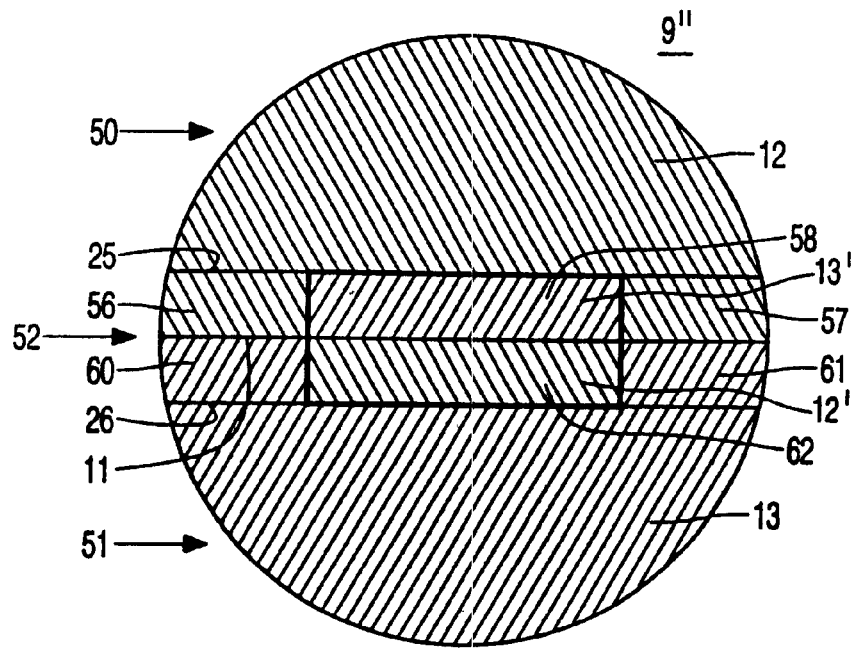
FIG. 11 shows a second embodiment of the diffraction element according to the invention.

FIG. 11 is a plan view of a second embodiment 9" of the diffraction element according to the invention. The surface of this element is divided again into a first area 50 in which the greater part of the first grating 12 is located, a second area 51 in which the greater part of the second grating 13 is located, and a transition area 52 in which further parts of the two gratings are located. The gratings 12 and 13 extend as far as the boundary line 11 on the left and right-hand sides of the element. In the central part of the element 9", the positions of the grating parts 12' and 13' are interchanged so that the transition area is now divided into six sub-areas. The upper part of the transition area comprises two sub-areas 56 and 57 in which parts of the first grating are located, and a sub-area 58 in between, in which a part 18' of the second grating is located. The lower part of the transition area comprises two sub-areas 60 and 61 in which parts of the second grating 13 are located, and a sub-area 62 in between, in which a part 12' of the first grating is located.

Figures 12A, 12B:
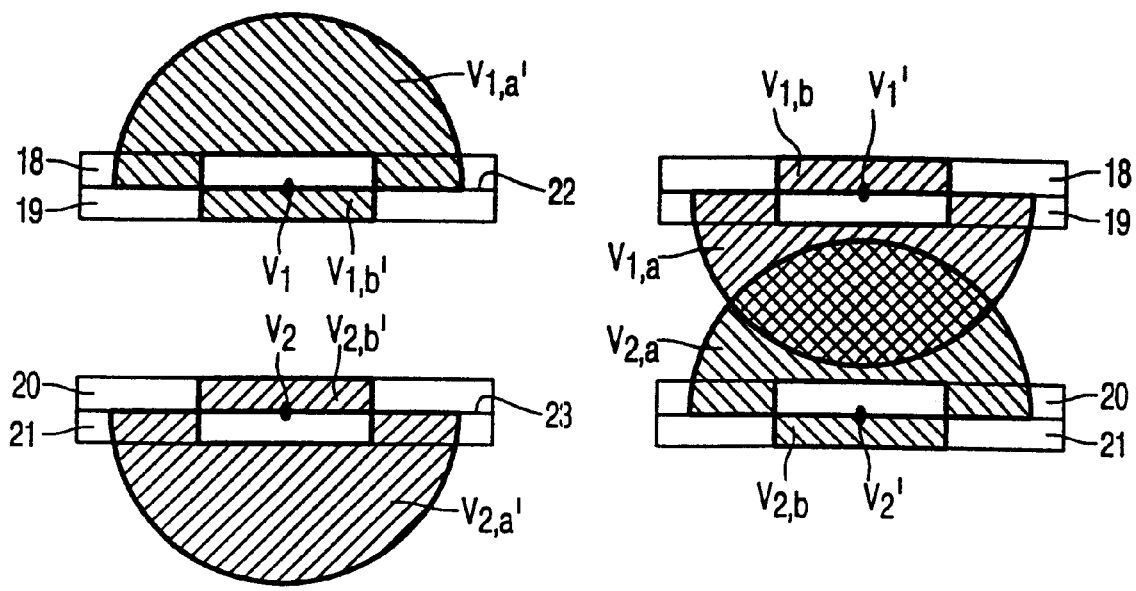
FIGS. 12a and 12b show the additional radiation spots formed on the detection system by means of this element.

The detection spots and the additional spots formed on the detection system in a device with the diffraction element 9" of FIG. 11 are shown in FIGS. 12a and 12b. FIG. 12a shows the situation where the scanning beam is focused on the information layer 2. The detection spots $V_1$ and $V_2$ then have a minimal dimension and are located symmetrically with respect to the separating strips 22 and 23, respectively. The additional radiation spots, formed by radiation from the information layer 2', now consist of two parts. The first, largest, part $V'_{1,a}$ of the first additional spot is located on one side of the separating strip 21, and the second, central, part $V'_{1,b}$ of this additional spot is shifted towards the other side of this separating strip. The first part $V'_{2,a}$ of the second additional spot is located on one side of the separating strip 23, while the second, central, part $V'_{2,b}$ of this spot is shifted towards the other side of this separating strip. By suitable choice of the length and width of the central parts $V'_{1,b}$ and $V'_{2,b}$, i.e. by suitable choice of the length and width of the grating portions 12' and 13', respectively, in FIG. 11, it is achieved that the detection elements 18 and 19 receive the same amount of radiation from the first additional spot, and the detection elements 20 and 21 receive the same amount of radiation from the second additional spot. These additional spots then do not cause any difference between the output signals of the detection elements 18 and 19 and the output signals of the detection elements 20 and 21, respectively, so that the presence of the second information layer does not result in an offset of the focus error signal.

FIG. 12b shows the situation where the scanning beam is focused on the information layer 2', so that the spots $V'_1$ and $V'_2$ are the detection spots and the spots $V_1$ and $V_2$ are the additional spots. Here again, the detection elements of a pair receive the same amount of radiation from the associated additional spot so that there is no focus offset due to the presence of the information layer 2.

The transition area 52 may be alternatively subdivided into more than the six sub-areas shown in FIG. 11. It should then always be ensured that the overall surface of the parts of the first grating in the transition area is, in principle, equal to the joint surface of the parts of the second grating. In the case where the scanning beam is a uniform beam, these joint surfaces are equal. If the scanning beam is not uniform, for example if it has a Gaussian intensity distribution, this should be taken into account and the sizes of the corresponding sub-areas of the two gratings may be slightly different.

The invention may not only be used when reading a record carrier having two information layers, but also when reading a record carrier having a plurality of information layers.

The device according to the invention may not only be used when reading a record carrier having a plurality of information layers but also when writing such a record carrier. A writing device is distinguished from the reading device in that the scanning beam, the write beam, is intensity-modulated in conformity with the signal to be written. Such an intensity modulation may be realized by means of a separate intensity modulator arranged in the radiation path of the write beam, for example, an acousto-optical modulator, or by means of direct modulation of the diode laser 4 by applying the signal to be written to this diode laser.

The invention has been described hereinbefore with reference to a diffraction element whose two gratings have the same grating period, while the grating strips of the first grating and those of the second grating extend at different, for example opposite, angles to the direction of the boundary line, or the edges of the transition area. However, the invention may also be used in a device in which the two gratings of the diffraction element have different grating periods, while the grating strips of the first grating extend at the same angle to said direction as those of the second grating. Such a diffraction element is described in, for example, U.S. Pat. No. 4,908,506. As described in this patent application and shown in FIG. 6, the two pairs of detection elements must then be located behind each other in the direction of the boundary line, or the edges of the transition area, of the diffraction element and no longer in a direction transverse to this boundary line or said edges, as in the embodiments described above.

U.S. Pat. No. 4,908,506 also describes a device with a diffraction element whose gratings have different grating periods, while the grating strips of the first grating also have a different direction than those of the other grating. In the detection system of this device, the two pairs of detection elements are shifted with respect to each other in two mutually perpendicular directions.

A scanning device in which a diffraction element is used for separating the reflected and the on-going beam is sensitive to wavelength variations which may particularly occur in a diode laser as a radiation source and as a result of, for example, temperature variations. In fact, the angle at which a beam is diffracted by a grating is dependent on the wavelength. At a wavelength change of the scanning beam, the detection spots may shift with respect to the detection elements, independent of a focus error, so that the wavelength variation may be a different source of focus offset. By orienting the separating strips of the pairs of detection elements in such a way that the shifts of the associated detection spots due to a wavelength variation occur along these separating strips, the risk of focus offset is reduced considerably.

The effect has not been taken into account that, at a wavelength variation and the defocusing of the reflected sub-beams caused thereby with respect to the plane of the detection system, the detection spots also become asymmetrically larger so that the point of gravity of the intensity distribution of such a spot shifts with respect to the separating strip of the associated pair of detection elements. The influence of this effect may be eliminated by orienting the separating strips in such a way that the path along which the point of gravity of the intensity distribution of a detection spot shifts at a wavelength change coincides with the separating strip of the associated pair of detection elements. In practice, this means that the separating strips extend at a small angle to the line connecting the center of the radiation-emissive surface of the radiation source to the center of the detection system.

It is alternatively possible to design the device in such a way that the separating strips of the pairs of detection elements are parallel to said connection line, which simplifies the alignment during assembly, while the center of the intensity distribution of a detection spot still moves along the associated separating strip in the case of a wavelength change. Such a device is also described in U.S. Pat. No. 4,908,506.

The invention may not only be used in a device in which two pairs of detection elements are used, but also in a device in which the detection system comprises one pair of detection elements for generating the focus error signal and a further detection element for other purposes. Such a detection system comprises, for example, the pair of detection elements 18 and 19, as in the embodiments described above, but the pair of detection elements 20 and 21 has been replaced by a single element. In combination with the pair 18, 19, this element is used for, for example, generating the read signal and/or the tracking error signal. If the tracking is realized with two extra, tracking, spots, the detection system is provided with extra detection elements for the tracking detection spots.

In the Figures, the grating strips are shown as straight strips. As described in U.S. Pat. No. 4,829,506, the grating strips are preferably slightly curved and the gratings have a varying grating period. The diffraction element thereby acquires some optical strength which may be used during assembly of the device for performing corrections by displacing the diffraction element with respect to other elements in the device.

A scanning device in which, in addition to the diffraction element, an extra diffraction grating is used for forming tracking spots, is described in U.S. Pat. No. 4,924,079.

What is claimed is:

1. An optical device comprising:
   a radiation source for supplying a scanning beam;
   an objective system for focusing the scanning beam to a scanning spot on a desired information layer selected from two or more information layers:
   a composite radiation-sensitive detection system including separate detection elements for multiple respective detection spots and at least two detection elements for at least one of the detection spots;
   a composite diffraction element arranged between the radiation source and the objective system and including two contiguous gratings for diffracting a radiation beam coming from the desired information layer to the detection system and for splitting the beam into a first and a second sub-beam providing a first and a second detection spot in a plane of the detection system, a surface of the composite diffraction element includes: a first area in which a main part of a first grating of the two gratings is located, a second area in which a main part of a second grating of the two gratings is located, and a third, elongated transition, area in which further parts of the first and the second grating are located, the surface occupied by the first grating in the transition area being, approximately equal to the surface occupied by the second grating in the transition area.

2. The device of claim 1, in which the transition area includes a first and a second portion in which a part of the first grating and a part of the second grating, respectively, are located.

3. The device of claim 1, in which the transition area has a boundary line, on one side of which a part of the first grating is enclosed by two parts of the second grating, and on the other side of which a part of the second grating is enclosed by two parts of the first grating.

4. The device of claim 1, in which the detection system includes a first and a second pair of detection elements for the first and the second detection spot.

5. The device of claim 4, in which the separating strip in each pair of detection elements is oriented in such a way that:
   the path along which a center of an intensity distribution of the associated detection spot is displaced at a change of the wavelength of the scanning beam, coincides with the separating strip; and
   the separating strip is parallel to a line connecting a center of an emissive surface of the radiation source to a center of the radiation-sensitive detection system.

6. The device of claim 1, in which the gratings have a varying grating period and curved grating strips.

7. The device of claim 1, in which the two gratings have the same grating period, an average direction of grating strips of one of the gratings extends at a first angle and an average direction of grating strips of the other grating extends at a second, opposite, angle to edges of the transition area, and pairs of detection elements are arranged one behind the other in a direction transverse to the direction of the edges.

8. The device of claim 1, in which grating strips of the gratings have direction and the grating strips of one grating have the same average direction as the grating strips of the other grating, an average grating period of each of the two gratings are different, and pairs of detection elements are located one behind the other in a direction parallel to a direction of edges of the transition area of the diffraction element.

9. The device of claim 1, in which an average grating period of each of the two gratings are different, an average direction of grating strips of one grating extends at a first angle and an average direction of grating strips of the other grating extends at a second, opposite, angle to edges of the transition area, and the pairs of detection elements are placed at different positions, both in a direction parallel to and in a direction transverse to the direction of the edges.

* * * * *